United States Patent Office 3,210,585
Patented Oct. 5, 1965

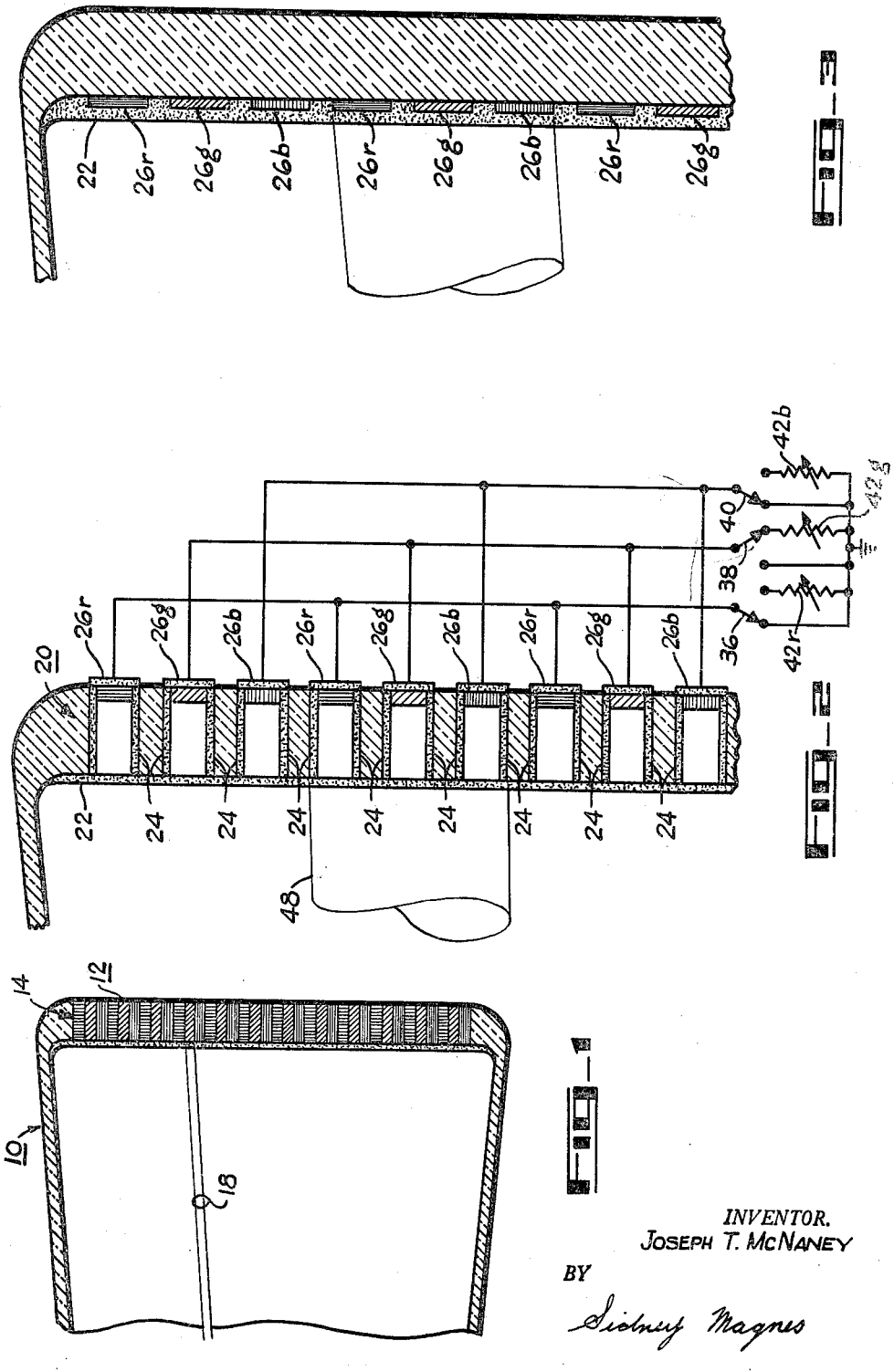

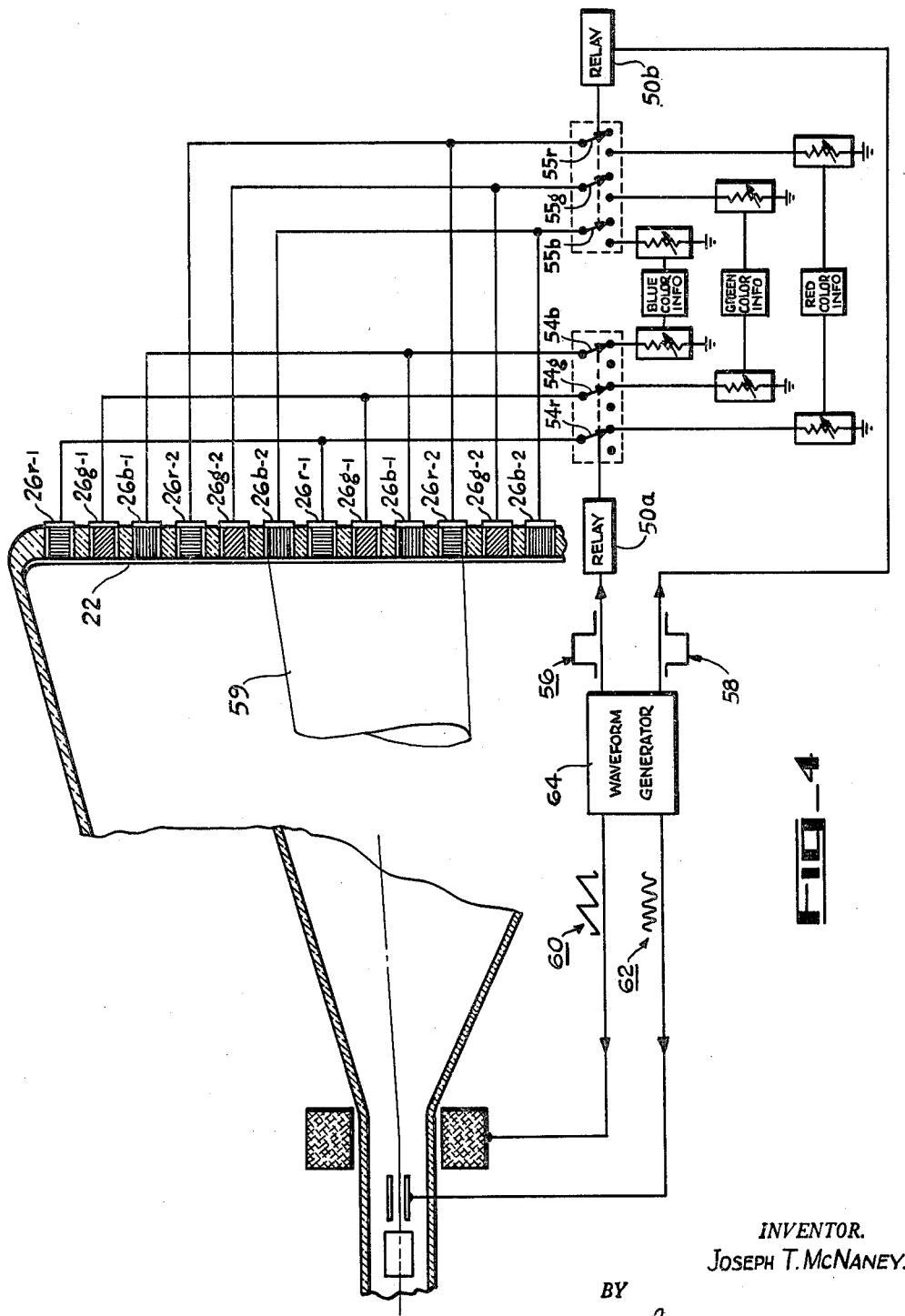

3,210,585
HORIZONTAL COLOR STRIPE TUBE WITH INTERLACING SCAN AND BEAM VELOCITY MODULATION
Joseph T. McNaney, La Mesa, Calif., assignor to General Dynamics Corporation, Rochester, N.Y., a corporation of Delaware
Filed Mar. 1, 1960, Ser. No. 12,158
1 Claim. (Cl. 313—92)

This invention relates to television-type color displays, and more particularly to apparatus and circuits that produce this result.

In the past, several approaches have been used to produce color displays for television. Two of the most successful have been the "stripe-tube" and the "tri-gun and apertured-mask combination"; but each of these has its own inherent shortcomings.

It is therefore the principal object of my invention to provide an improved tube and system for producing color displays.

The attainment of this object and others will be realized from the following specification taken in conjunction with the drawings, of which:

FIGURE 1 shows a cathode ray tube embodying my invention;
FIGURE 2 is another embodiment of my invention;
FIGURE 3 illustrates a further embodiment; and
FIGURE 4 shows still another embodiment.

Broadly speaking, my invention contemplates a cathode ray tube having a faceplate that comprises color-selective elements. The various embodiments of my invention produce color displays by the use of a light emitter—such as a phosphor or an electro-luminescent material, and color filtering elements that produce selected colors. Phosphors which emit white light upon being bombarded by an electron stream are suitable; for instance, zinc beryllium zirconium silicate may be utilized.

The basic concept of my invention is disclosed in FIGURE 1—which shows a portion of a cathode ray tube 10, whose faceplate 12 comprises a bundle-like array 14 of light guides held together by a vacuum-tight material. The light guides proper are rods of material having good light transmitting characteristics; their operation being such that light directed into one end is very efficiently transmitted to be emitted by the other. Rods of very small diameter are known as "optical fibers," and are often used to provide high resolution displays. Array 14 comprises light guides, preferably optical fibers, having their ends alined to form the inner and outer surfaces of the tube's faceplate.

In order to produce the color display, I use three types of optical fibers. The first type transmits red light, and will be called "red" fibers; the second type transmits green light and will be called "green" fibers; and the third type transmits blue light and will be known as "blue" fibers. These colors are illustrative only, but are chosen because they are "additive" colors that may be combined to produce a multicolor display. Of course, guides transmitting additional colors or other additive colors can be used.

In FIGURE 1, light guide array 14 is of the "parallel line" type. The first horizontal line consists of red fibers; the second horizontal line consists of green fibers; and the third horizontal line consists of blue fibers. The three lines form a triad, and these triads are cyclically repeated to form parallel line array 14.

Fiber array 14 provides a color display in the following manner. On the inner surface of faceplate 12 is a fluorescent screen 16 that produces either white light or light that contains red, green, and blue components. Fluorescent screen 16 operates in a manner well known in the art; namely, when electron beam 18 strikes it, a spot of light is produced; a more intense electron beam producing a more intense spot of light.

The electron beam is preferably so fine that the light spot produced by the fluorescent screen encompasses the end of only a single fiber; and the resultant light enters the end of only that fiber. Due to the fiber's color filtering action, the emitted light will be the color of that particular fiber. Thus, the area of impingement of the electron beam determines which color appears in the visual display; and the intensity of the color is controlled by the intensity of the electron beam and the color-filtering action of the fiber.

To form a multicolor color display, the point of impingement first sweeps from one end of a red line to the other, the intensity of the electron beam being varied to produce various shades of red. The point of impingement then sweeps across a blue line to produce various shades of blue. Shades of green are produced by sweeping across a green line. By the time the electron beam has swept all the lines of the array, a composite color display has been produced.

At times it may be preferable that the electron beam scan at an angle to the lines, or perpendicular thereto.

My invention thus produces a color display without the convergence voltage problem associated with the use of three electron guns, or the switching problem inherent in the stripe tube.

FIGURE 2 shows another embodiment of my invention, wherein the inner surface of the faceplate has positioned thereon—not a fluorescent screen, but a coating of electroluminescent material 22 which glows when a varying electrical voltage is impressed across it.

In order to apply a voltage to the front surface of electroluminescent coating 22, an optical fiber array 20 is used; this being similar to the one previously discussed. The fibers—as shown—may have the color-filtering effect concentrated at one area, instead of being distributed throughout the fiber. Each fiber now has a circumjacent sleeve 24 of conductive material; the sleeves of each line being preferably, but not necessarily, insulated from each other. The internal ends of sleeves 24 are adjacent the front surface of electroluminescent material 22, and their external ends are connected to strips 26 of transparent conductive material, such as tin oxide. A "red" strip, 26r, of transparent conductive material is positioned along each line of red fibers, and in electrical contact with the external ends of the sleeves associated with the red fibers. A "green" strip, 26g, of transparent conductive material is similarly positioned along the sleeves of each line of green fibers; and a "blue" strip 26b, of transparent conductive material is positioned in electrical contact with the sleeves along each line of blue fibers. In the embodiment of FIGURE 2 all the red strips are electrically connected, all the blue strips are connected together, and all the green strips are interconnected—thus forming a set of red strips, a set of green strips, and a set of blue strips. Respective sets are connected—for reasons to be hereinafter discussed—to switches 36, 38, 40 and thence to a fixed reference potential, as shown in FIGURE 2 as ground. In this way the front surface of the electroluminescent material adjacent red and/or green and/or blue fibers is connected to ground potential by closing given switches.

A potential is applied to the opposite, or back, surface of the electroluminescent material as follows. An electron beam 48, produced and positioned by well known means, impinges on the back surface of electroluminescent material 22. In a manner to be later described in greater detail, the electrons of beam 48 are "velocity modulated"; i.e., have their velocity cyclically varied. When the electrons are moving at a low velocity, they accumulate on the back surface of electroluminescent material 22, and produce a negative potential. As the electrons velocity is increased they bombard the electroluminescent material to drive off "secondary" electrons—which leaves a positive charge on the back surface of the electroluminescent material. Thus, a varying potential is produced on the back surface of electroluminescent material 22.

When all the switches are closed, the entire front surface of electroluminescent material 22 is at ground potential—while an impinged-upon area of the back surface alternates between a positive and a negative potential. The varying potential across the impinged areas of the electroluminescent material causes it to glow at that point, and the light passes through the color-selective light guides to produce a color display.

When the "red" switch 36 is open, all the areas of electroluminescent material adjacent red fibers are disconnected from ground, and a varying potential cannot be impressed across them; therefore, no red light is produced. Thus, if switches 36, 38, and 40 are activated by incoming color signals, they would therefore control the presence or absence of selected colors in the display; i.e., if there is no blue color signal, switch 40 would be open—and the blue fibers will not produce blue light. To summarize, to produce light of a given color, two conditions must be met: (1) the electron beam must impinge on back surface of the electroluminescent material opposite a fiber of that color, and (2) the front surface of the electroluminescent material adjacent that fiber must be connected to ground.

Since the light output of an electroluminescent material varies with amplitude of the potential impressed across it, the embodiment of my invention shown in FIGURE 2 permits brightness control by controlling the velocity variations of the electron beam—and thus the maximum potential variations applied to the back surface of the electroluminescent material.

Alternatively, the brightness can be controlled by throwing switches 36, 38, and 40, to their second positions—whereby strips 26 are connected to ground through variable impedances 42r, 42g, and 42b. When the variable resistances are at their minimum value, the strips are effectively connected to ground—and the electroluminescent material glows with maximum brightness. When, however, the resistances are at their maximum value, the strips are—to all effects—disconnected from ground, and the electroluminescent material will not glow. It may thus be said that the variable resistances produce a variable reference potential. While the variable resistances have been shown symbolically, they would actually comprise circuits under the control of the incoming red, green, and blue video signals.

The embodiment of FIGURE 3 is similar to the one previously discussed, except that (1) the transparent conductive strips 26r, 26g, and 26b are positioned adjacent electroluminescent material 22, and (2) strips 26 are now themselves color selective. Many suitable materials for this purpose are known under the name of dichroic filters, anti-static coatings, and shielding coatings. They generally comprise thin metallic films that transmit electricity and light. Gold leaf is one example, being electrically conductive and transmitting green light. The embodiment of FIGURE 3 thus obviates the need for the conductive sleeves, and the optical fibers may also be omitted at the cost of resolution. The operation is the same as described, the wiring having been omitted from the drawing for the sake of clarity.

While the foregoing explanation has discussed the production of a color display in general terms, my invention is particularly applicable for use with a shaped beam tube. In tubes of that type, the electron beam has an instantaneous cross section that corresponds to a character—such as a letter, number, or symbol. When my invention is used in conjunction with a shaped beam tube, the resultant character appears in a color and shade that depends upon which conductive strips are connected to ground, and the resistance of the connection. Thus, by proper keying of the switches and/or resistances, characters can be produced in various colors.

It is apparent that the optical fibers may be round, oval, square, triangular, hexagonal, or any other desired cross section; and that conductive material 24 does not have to completely surround the fiber, but may extend along only selected sides thereof.

In order to get the three colors simultaneously, the electron beam should be large enough to encompass the ends of three different-colored optical fibers. This would imply that the electron beam should preferably have a cross section that is vertical rectangle; i.e., three units high and one unit wide. Due to tolerances and imperfections in the electron gun and electron-optical elements, the cross section of the electron beam may become unduly elongated, so as to overlap two fibers of the same color. In the resulting display, this would mean that there might be two red, green, or blue spaced-apart spots—where only one is desired.

The embodiment of FIGURE 4 has the advantage that the electron beam's size is of secondary importance. This result is achieved by assuring that two adjacent strips of the same color are never simultaneously connected to energizing reference potentials; so that even if the beam should impinge opposite two similarly colored fibers, only one would produce light. To accomplish this result, I divide each set of conductive strips (26r, 26g, and 26b) into two sub-sets (26r–1, 26r–2; 26g–1, 26g–2; 26b–1, 26b–2) together with alternate strips associated with the same color. The sub-sets are then grouped to form a group of odd-numbered triads, and a group of even-numbered triads. The conductive strips of the odd- and even-numbered triads are connected to ground through a circuit comprising a variable resistance as previously described, and a series-connected switch—whose operation will be hereinafter explained.

As previously explained, the electroluminescent material may be made to glow only when its front surface is connected to ground. I, therefore, alternately connect the odd-numbered triads and the even-numbered triads to ground. I achieve this result by alternately energizing actuators—such as relays 50a and 50b, by means of the positive-going portions of wave forms 56 and 58, so that the relays alternately close switches 54 and 55. Thus, during the positive-going portion of waveform 56, relay 50a is energized thereby closing switches 54r, 54g, and 54b—and connecting the sub-strips of the odd-numbered triads to ground. When the velocity-modulated electron beam 59 impinges opposite a line of an odd-numbered triad, the front surface of the electroluminescent material is grounded, and therefore glows to produce colored light as previously described. Even if the electron beam should impinge opposite elements of an even-numbered triad, light cannot be produced—because these triads are disconnected from ground by open switches 55r, 55g, and 55b. After a given interval, the negative-going portion of waveform 56 de-energizes relay 50a, causes its associated switches to open, and extinguishes the odd-numbered triad. Simultaneously, the positive-going portion of waveform 58 energizes relay 50b, closes switches 55r, 55g, and 55b, and the even-numbered triads produce light in the previously described manner.

In FIGURE 4, the brightness of the display is controlled by the amplitude of the incoming color information, which controls the magnitude of the variable resistances; the presence or absence of these signals also determines whether or not a given color will appear.

As is well known a "sawtooth waveform" 60 deflects the electron beam across the width of the tube, this being known as a "horizontal scansion." If the lines of the display are horizontal, and the electron beam moves horizontally, the rectangular portions of waveforms 56 and 58 may have durations equal to the horizontal scansion; that is, they may last for the entire length of time that is required for the electron beam to move from one side of the faceplate to the other. This would result in a display wherein sequentially positioned triads sequentially produce their characteristic colors to form a complete display, this type of display being known as "frame sequential" display.

Alternatively, the rectangular portions may have a duration such that all the odd-numbered triads are energized, and then all the even-numbered triads are energized. This arrangement, known as the "interlaced" display presently used in television, requires that each rectangular portion last for a complete field.

In order to velocity-modulate the electron beam as previously described, a varying waveform 62 is applied to the accelerating electrode of the tube. This waveform is preferably of a high frequency, but does not necessarily have to be synchronized with the others. Circuitry for producing all these waveforms is well known, and shown schematically as waveform generator 64.

While the foregoing discussion has been devoted to a line-type color tube, the fibers can be arranged in a "grouped dot" array, rather than in parallel lines. Under this arrangement, a round electron beam will—without the necessity for an apertured mask—impinge on a triad of different-colored fibers, each of which will produce its characteristic color under the control of incoming color signals.

The invention illustrated and described herein is illustrative only and the invention includes such other modifications and equivalents as may readily appear to those skilled in the art, within the scope of the appended claim.

The embodiments of the invention in which an exclusive property or privilege is claimed are defined as follows:

Apparatus for producing a color display comprising a cathode ray tube having a faceplate; said faceplate including a layer of electroluminescent material, an individual set of color filter parallel stripes for each one of a given plurality of different colors oriented to have one side of each stripe facing one side of said layer of electroluminescent material, the respective stripes of each individual set being interleaved in regular order between and spaced from the respective stripes of other sets which are adjacent thereto to provide repetitive groups of contiguous stripes wherein each group is composed of a single stripe from each set arranged in a predetermined order, each stripe having the other side thereof coated with a transparent electrical conductor, and adjacent stripes being insulated from each other; said cathode ray tube further having electron-beam producing means including a cathode for producing an electron beam oriented to impinge upon the other side of said layer, said electron beam having a dimension in a direction perpendicular to said parallel stripes at least approximately equal to the width of a single group of stripes and at the most less than the width of two adjacent groups of stripes; selectively-enabled first means including an individual variable impedance means corresponding solely to the stripes of each respective set within all the odd groups of stripes for connecting the transparent electrical conductor of every stripe corresponding thereto to said cathode only when said first means is enabled; selectively-enabled second means including an individual variable impedance means corresponding solely to the stripes of each respective set within all the even groups of stripes for connecting the transparent electrical conductors of every stripe corresponding thereto to said cathode only when said second means is enabled; third means for deflecting said electron beam to sequentially scan different individual groups, fourth means for enabling said first means only during the scan of any odd groups and for enabling said second means only during the scan of any even group, and fifth means for velocity modulating said electron beam to produce an alternating potential at said layer.

References Cited by the Examiner

UNITED STATES PATENTS

| | | | |
|---|---|---|---|
| 1,751,584 | 3/30 | Hansell | 88—1 X |
| 1,848,814 | 3/32 | Allen | 88—1 |
| 2,091,152 | 8/37 | Malpica | 313—92 X |
| 2,122,750 | 7/38 | Nicolson | 313—92 X |
| 2,495,697 | 1/50 | Chilowsky | 313—92 X |
| 2,510,106 | 6/50 | Henroteau | 313—92 X |
| 2,660,684 | 11/53 | Parker | 313—67 |
| 2,728,815 | 12/55 | Kalfaian | 178—5.4 |
| 2,757,302 | 7/56 | Hughes | 313—92.5 X |
| 2,773,992 | 12/56 | Ullery | 313—329 X |
| 2,813,223 | 11/57 | Kalfaian | 178—5.4 X |
| 2,872,613 | 2/59 | Kalfaian | 178—5.4 X |
| 2,967,248 | 1/61 | Nicoll. | |
| 2,976,447 | 3/61 | McNaney. | |
| 2,983,835 | 5/61 | Frey | 313—89 |
| 2,992,349 | 7/61 | Cusano | 313—92 |
| 3,041,490 | 6/62 | Rajchman et al. | 315—169 X |
| 3,043,179 | 7/62 | Dunn | 313—89 X |

OTHER REFERENCES

RCA TN No. 136, RCA Laboratories, Princeton, New Jersey, Mar. 7, 1958.

GEORGE N. WESTBY, *Primary Examiner.*

RALPH G. NILSON, ROBERT SEGAL, *Examiners.*